(12) United States Patent
Phelps et al.

(10) Patent No.: US 7,535,129 B2
(45) Date of Patent: May 19, 2009

(54) METHOD AND APPARATUS FOR TRANSFER OF A CRITICAL LOAD FROM ONE SOURCE TO A BACK UP SOURCE USING MAGNETICALLY LATCHED RELAYS

(75) Inventors: David R. Phelps, Chardon, OH (US); Fred Tamjidi, Pepper Pike, OH (US)

(73) Assignee: TwinSource, LLC, Solon, OH (US)

( * ) Notice: Subject to any disclaimer, the term of this patent is extended or adjusted under 35 U.S.C. 154(b) by 155 days.

(21) Appl. No.: 11/804,168

(22) Filed: May 16, 2007

(65) Prior Publication Data

US 2008/0054722 A1 Mar. 6, 2008

Related U.S. Application Data

(60) Provisional application No. 60/747,484, filed on May 17, 2006.

(51) Int. Cl.
*H01H 31/10* (2006.01)
(52) U.S. Cl. .......................................... 307/115; 307/85
(58) Field of Classification Search .................. 307/85, 307/115; 361/160, 166, 170, 189, 194, 206; 335/209, 219, 285
See application file for complete search history.

(56) References Cited

U.S. PATENT DOCUMENTS

| | | | | |
|---|---|---|---|---|
| 2,736,821 A | * | 2/1956 | Stineman | 307/64 |
| 4,910,634 A | * | 3/1990 | Pipkorn | 361/147 |
| 5,703,550 A | | 12/1997 | Pawlak et al. | |
| 5,949,315 A | * | 9/1999 | Kalb | 335/179 |
| 6,538,345 B1 | * | 3/2003 | Maller | 307/86 |
| 7,196,433 B2 | * | 3/2007 | Yang | 307/35 |
| 2001/0035755 A1 | * | 11/2001 | Shirato | 324/418 |
| 2001/0045785 A1 | * | 11/2001 | Chen et al. | 310/104 |
| 2006/0145794 A1 | * | 7/2006 | Batteux | 335/128 |

OTHER PUBLICATIONS

Website regarding *16 Amp Magnetic Latching Relays* printed Nov. 19, 2007 (product introduction date unknown).

\* cited by examiner

*Primary Examiner*—Albert W Paladini
*Assistant Examiner*—Daniel Cavallari
(74) *Attorney, Agent, or Firm*—Fay Sharpe LLP

(57) ABSTRACT

An automatic transfer switch includes first and second magnetically latched relays that respectively connect first and second voltage sources to a critical load. The first and second relays are magnetically latched in their respective opened or closed positions by a permanent magnet so that no holding current is supplied to the relays after switching is completed. As such, no holding current is required for either relay in the non-transferred or the transferred state of the automatic transfer switch, which reduces heat generated by the relays which can lead to relay failure. A switching method uses the automatic transfer switch to switch voltage sources without requiring relay holding currents in either the non-transferred or transferred state. A method of reducing contact bounce is also disclosed.

6 Claims, 2 Drawing Sheets

METHOD AND APPARATUS FOR TRANSFER OF A CRITICAL LOAD FROM ONE SOURCE TO A BACK UP SOURCE USING MAGNETICALLY LATCHED RELAYS

CROSS-REFERENCE TO RELATED APPLICATION

This application claims priority from and benefit of the filing date of U.S. provisional patent application Ser. No. 60/747,484 filed May 17, 2006, which is hereby expressly incorporated by reference into the present specification.

BACKGROUND OF THE INVENTION

Automatic Transfer Switches used to transfer a critical electronic load from a preferred source to an alternate source that utilize standard relays have been in use for some time. There are two serious technical issues however associated with the use of standard relays that are either detrimental to the relay's longevity (thus reducing the reliability of the transfer switch device) or produce multiples of on-off voltage waveforms that are not acceptable to some of the more sensitive electronic loads (thus increasing the risk of dropping the critical loads).

The present invention makes use of a particular type of relay in an automatic transfer switch that overcomes both of these issues.

Conventional (prior art) designs for relay type automatic transfer switches use two types of standard relays; one relay has Normally Open (or NO) contacts and the other relay has Normally Closed (or NC) contacts with the relay coil de-energized in both cases. FIG. 1A shows such an automatic transfer switch ATS, wherein the NC relay R1 is used to power the critical load L from the primary or preferred source of power S1 and the NO relay R2 is used to connect the load L to an alternate or back-up source S2 when required. In the initial state of the transfer switch ATS as shown in FIG. 1A, the contacts of the NC relay R1 are closed and delivering voltage from the source S1 to the load L while the coil C1 of the relay R1 is de-energized, and the contacts of the NO relay R2 are open while the relay coil C2 is de-energized, but the contacts of the NO relay R2 are selectively closable by energizing the coil C2 to connect the load L to the alternate or back up source S2 if the preferred source S1 fails (goes outside a pre-set range) after coil C1 of R1 is energized to open the contacts of R1 thus completing the transfer operation.

The transfer switch ATS comprises sensing and control logic circuits P that determine if the voltage of the source the unit is connected to (the preferred or primary source S1) is within the desired range set by the user (or, typically, pre-set at the factory). This range of acceptable voltages to the user's critical load L is typically +or −10% to 12% of nominal. Once it is determined by the sensing and control logic circuits P that the source voltage S1 has fallen outside the required range and once the sensing and control logic circuits P also determine that the voltage of the alternate or back-up source S2 is within the acceptable range, then the control logic P of the transfer switch ATS commands the NC relay R1 to open (by energizing coil C1) to disconnect the load L from the primary source S1 and, after a certain amount of time delay, the control logic P also commands the NO relay R2 to close (by energizing coil C2) to connect the critical load L to the alternate or back up source S2, thus avoiding a disruption of the load, as shown in FIG. 1B and referred to herein as a "transferred" state. The total time for sensing of unacceptable voltage and the complete transfer operation (opening of the NC relay R1 and closing of the NO relay R2) is less than 20 milliseconds as established by the power quality industry as the acceptable length of an outage to critical electronic loads if they are to continue operation undisturbed. The purpose of the time delay before closing the contacts of the NO relay R2 is to be sure that the contacts of the NC relay R1 have indeed opened completely so there is no chance of a cross connection between the preferred and alternate sources S1,S2. A cross connection would create a cross current between an already failed primary source S1 and the good alternate source S2, thus causing the alternate source to fail as well and drop the critical load.

In the initial (non-transferred) state (FIG. 1A) of the automatic transfer switch ATS both relay coils C1, C2 are de-energized. This is intended by design because it has been well established that statistically the number one cause of failure in relays is the failure of the relay coil (it can either short or open and in both situations the relay is rendered non-functional and can no longer transfer—i.e., a standard relay with a failed coil will return to or remain in its default state under force of the relay biasing spring). The primary cause of relay coil failures is heat. Heat is generated when the relay coil is energized. It is therefore recognized that in order that the transfer switch product ATS remain reliable and durable to continue protecting the user's critical load, the exposure of the relay coil to heat must be minimized. With conventional (prior art) designs such as that shown in FIGS. 1A and 1B, this means that to the extent possible the NC relay coil C1 or the NO relay coil C2 should not be energized. In the above description of operation it is evident that once the preferred source S1 fails and the transfer switch ATS must transfer, both coils C1,C2 must be energized to make and maintain the transferred state. Typically, the coils C1,C2 are initially energized at twice their normal operating voltage in order to speed up the transfer process to quickly complete the transfer operation. Once the transfer from source S1 to source S2 is complete, the voltage to the relay coils C1, C2 is reduced to the "holding" voltage of the coil so the contacts of the NC relay R1 are held open and the contacts of the NO relay R2 are held closed to keep the user load L running on the alternate source S2 and disconnected from the failed preferred source S1. This transferred state, with both coils C1,C2 energized as shown in FIG. 1B, is a very undesirable state for the product and in time it will lead to degradation of the relay coil insulation and may cause it to deteriorate and ultimately fail.

Once the voltage of the preferred source S1 returns to within the normal range as determined by the voltage sensing circuits P then, after a user pre-set or factory pre-set time delay, the automatic transfer switch ATS will re-transfer from the transferred state (FIG. 1B) back to its normal state (FIG. 1A). In this re-transfer operation the contacts of the NO relay R2, which were closed for the transferred state, open and, after the required delay to ensure disconnection of the source S2 from the load L, the contacts of the NC relay R1, which had been opened for the transfer, close, in each case by de-energizing the coils C1, C2 and allowing the relay springs to move the contacts to their default states. The system is now back to its initial normal state (FIG. 1A), with the load L is being served from the preferred source S1, and with the coils C1, C2 of both relays R1,R2 de-energized. The accumulated time during the times the transfer switch is feeding the load L from the alternate source S2 is detrimental to the reliability and life of both relay coils C1, C2.

A second condition that causes both relay coils C1,C2 to be energized in conventional (prior art) automatic transfer switch devices is if the user elects to use the alternate source S2 as the preferred source for the transfer switch. In automatic transfer switches it is required that the user at his sole discretion be able to select either source S1, S2 as the preferred source for a certain critical load L. This is a requirement because users must be able to balance their loads on their two sources of clean power (typically two battery backed UPS systems). Typically it is desired that approximately one-half of the loads be on the preferred source S1 while the other half are on the alternate source S2. Therefore as many as one-half or more of the switches ATS may be set to feed their respective loads L from the alternate source S2 which once again causes that both relay coils C1,C2 remain energized for those transfer switches configured with the alternate source S2 as the preferred (default) source. Preferred source selection is usually made via a push button control or other means but without the need to swap power connection wires which would require that the load L be shut down. This normal state of being powered from the alternate source S2 is also detrimental to the relay life as both coils C1,C2 must be continuously energized to make the source S2 the preferred (default) source and, thus, both coils C1,C2 are subjected to continuous heat with the above-noted undesirable effects.

Another problem with the use of standard relays in transfer switch applications is "contact bounce". It is well established that when at the start of a transfer operation the relay coils are first energized by high voltage (usually twice the rated coil voltage) to speed up the transfer, the relay contacts make a solid contact by the added force of the higher voltage which after a short time delay is reduced down to a holding voltage at the rated coil voltage. There is either no contact bounce or only perhaps a single one (which does not affect critical loads) in many, many transfers if the output voltage being provided to the critical load is observed by an oscilloscope, because movement of the contacts is actively induced by the coil. In the automatic retransfer operation that follows, however, the holding voltage is simply removed from the coils C1,C2 to allow the relay contacts to relax back to their original (normal) states under force of a biasing spring in each relay R1,R2. Because there is no high voltage to add contact-moving force to this process and the contacts are simply returning by the small force of the spring in the relays R1,R2 that hold the contacts in NC and NO states respectively, the contacts bounce in the absence of any voltage on the coils C1,C2. This contact bounce causes numerous zero crossings of the load voltage as the contacts make and then break and then make and then break and so on. There can be many bounces before the contacts relax to their NC or NO positions. Critical loads L however can be affected by this repetitive and rapid voltage on-off condition or energizing and de-energizing and can drop. Indeed there have been cases of sensitive loads dropping and causing financial losses to the user. In such cases the users have removed the relay type transfer switches ATS and replaced them with SCR based solid state transfer switches that have no contacts since they are solid state.

SUMMARY

In accordance with a first aspect of the present invention, an automatic transfer switch includes a first voltage input adapted for connection to a first associated voltage source and a second voltage input adapted for connection to a second associated voltage source. A first magnetically latched relay has an opened state and a closed state, wherein the first magnetically latched relay is magnetically latched in either its opened or closed state by a permanent magnet and without a holding current supplied to the first magnetically latched relay. A second magnetically latched relay has an opened state and a closed state, wherein the second magnetically latched relay is magnetically latched either its opened or closed state by a permanent magnet and without a holding current supplied to the second magnetically latched relay. The second magnetically latched relay is in its opened state when the first magnetically latched relay is in its closed state, and the second magnetically latched relay is in its closed state when the first magnetically latched relay is in its opened state. First and second voltage outputs are adapted for connection to an associated load. The first voltage output is selectively connected to the first voltage input via the first magnetically latched relay when the first magnetically latched relay is in its closed state, and the second voltage output selectively connected to the second voltage input via the second magnetically latched relay when the second magnetically latched relay is in its closed state. A voltage sensing and control logic circuit monitors the first and second voltage inputs and selectively and temporarily energizes the first and second magnetically latched relays, wherein one of the first and second magnetically latched relays changes from its opened state to its closed state and the other of said first and second magnetically latched relays changes from its closed state to its opened state when the first and second magnetically latched relays are selectively and temporarily energized by said voltage sensing and control logic circuit.

In accordance with another aspect of the present invention, a method for selectively connecting a load to either a first voltage source or a second voltage source includes connecting a load to a first voltage source through a first magnetically latched relay comprising first contacts that are held in a closed state without a holding current. Temporarily energizing the first magnetically latched relay to open the first contacts to disconnect the first voltage source from the load, wherein the first magnetically latched relay is deenergized after the first contacts are opened and the first contacts are held open by a first permanent magnet without a holding current being supplied to the first relay. After the first voltage source is disconnected from the load a second magnetically latched relay comprising second contacts is temporarily energized to close said second contacts to connect said load to a second voltage source through the second magnetically latched relay, wherein the second magnetically latched relay is deenergized after the second contacts are closed and the second contacts are held closed by a second permanent magnet without a holding current being supplied to the second relay.

In accordance with another aspect of the present invention, a method of reducing contact bounce in an automatic transfer switch includes connecting a load to a first voltage source using a first relay. A fault is detected in the first voltage source. After detecting a fault in the first voltage source, the first relay is energized to electromagnetically open contacts of the first relay to disconnect the load from the first voltage source. After energizing the first relay to electromagnetically open the contacts of the first relay, the second relay is energized to electromagnetically close contacts of the second relay to connect the load to the second voltage source.

BRIEF DESCRIPTION OF THE DRAWINGS

FIGS. 2A and 2B illustrate an automatic transfer switch formed in accordance with the present development, wherein FIG. 2A shows the automatic transfer switch in its non-transferred state and FIG. 2B shows the automatic transfer switch in its transferred state.

DETAILED DESCRIPTION

The present invention makes use of magnetically latched relays to yield a much higher reliability automatic transfer switch product by eliminating the continuously energized state of the relays while the switch is connected to the alternate source. As used herein, the term "magnetically latched relay" is intended to encompass a relay having contacts that hold in both the opened and closed states by means of a magnet, e.g., a permanent magnet, without requiring the relay coil to be energized continuously to hold the relay contacts in either state. In a magnetically latched relay, as that term is used herein, the relay coil must be energized to move the contacts from the opened to the closed state and from the closed to the opened state, after which change-of-state, the coil is de-energized without causing any change-of-state of the relay contacts which are held in place by a magnet of the relay, i.e., the relay coil must be energized to move the relay contacts, but not to hold the relay contacts in either an opened or closed state because the holding is accomplished by means of a permanent magnets, i.e., a magnetic member that does not require electrical current to induce its magnetic field. In one embodiment, the permanent magnet is provided by a moving contact of the relay, i.e., the moving contact of the relay is, itself, a permanent magnet.

Figure 2A:
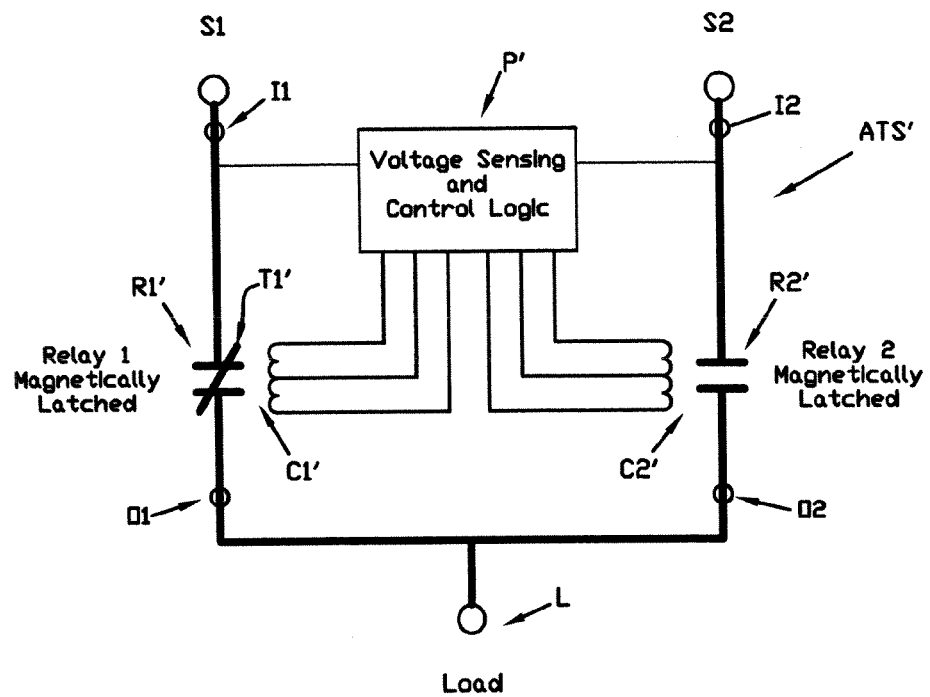
Figure 2B:
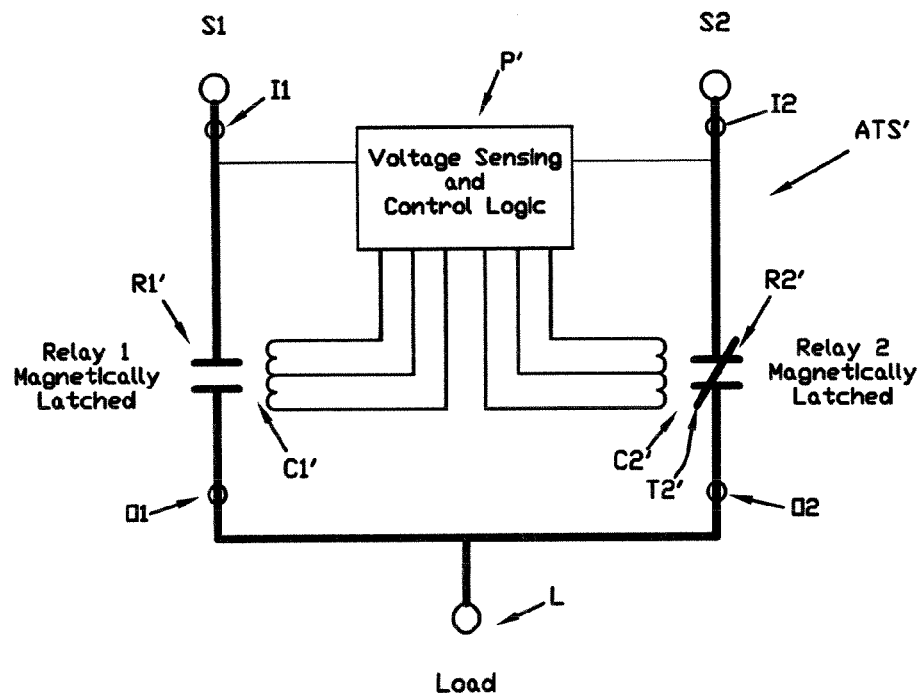

FIGS. 2A and 2B illustrate an automatic transfer switch ATS' formed in accordance with the present invention, including first and second magnetically latched relays R1',R2' having respective coils C1',C2', and including voltage sensing and control logic circuits P'. In the illustrated embodiment, the relays R1',R2' comprises respective moving swing arms or contacts T1',T2' that are permanently magnetized to provide the required permanent magnet, but other permanent magnets can be used without departing from the overall scope and intent of the present invention. The transfer switch ATS' operates to connect the load L to either the primary voltage source S1 or secondary voltage source S2 based upon the control of the voltage sensing and control logic circuits P'. The primary (first) and secondary (second) voltage sources S1,S2 are connected to the automatic transfer switch ATS' respectively via primary (first) and secondary (second) voltage inputs or input connectors I1, I2, and the load L is connected to the automatic transfer switch ATS' via first and second outputs or output connectors O1,O2 that are respectively connected to the first and second magnetically latched relays R1',R2'. The coils C1',C2' each comprise a first coil that is energized to open the contacts of the relays R1',R2' and each comprise a second coil that is energized to close the contacts of the relays R1',R2'. Alternatively, single coil magnetically latched relays are known and can be used according to the present development.

Figure 1A:
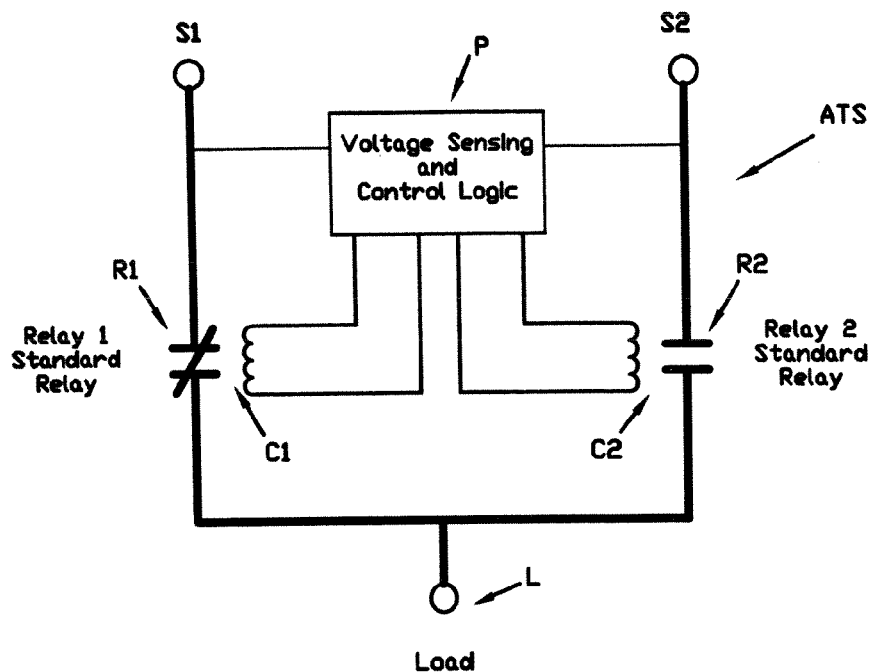
FIG. 1A (prior art) shows such an automatic transfer switch in a non-transferred state wherein a first relay is used to power a critical load from the primary voltage source and a second relay is used to connect the load to an alternate or back-up source S2 when required.
Figure 1B:
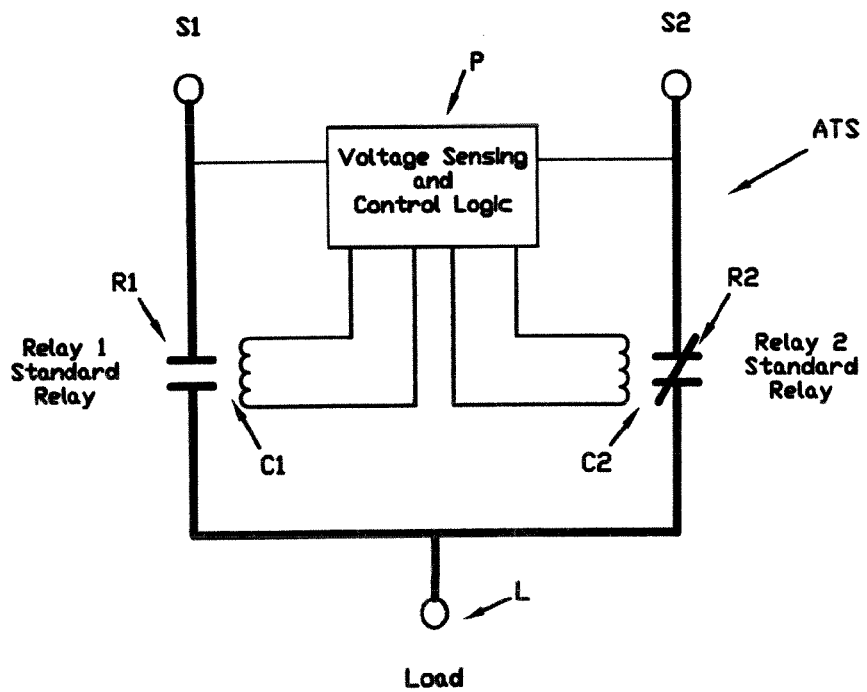
FIG. 1B (prior art) shows such the automatic transfer switch of FIG. 1A in its transferred state wherein the first relay is opened and the second relay is closed so that the load is powered by the alternate or back-up source.

Referring to FIG. 2A, in the non-transferred (default) state, the coil C1' of the first magnetically latched relay R1' is de-energized and the contacts of the relay R1' are initially closed (a "closed state") to connect the source S1 to the load L (just as in the description of operation above for the regular relays in connection with FIG. 1A). The coil C2' of the second magnetically latched relay R2' for the alternate source S2 is likewise de-energized and the contacts of the relay R2 are initially open (an "opened state") so that the source S2 is disconnected from the load L. Once a transfer operation is commanded by the control logic P' due to a failure of the source S1 as described above in connection with FIGS. 1A,1B, the preferred source relay coil C1' is energized to open the contacts of the relay R1' and after a time delay the coil C2' of the alternate source relay R2' is energized to close the contacts of relay R2' to complete the transfer process from the source S1 to the source S2 as shown in FIG. 2B. After a preset time delay both coils C1' and C2' are de-energized, and the contacts of the relay R1' remain open by magnetic latching and the contacts in the relay R2' remain closed by magnetic latching without the coils C1',C2' being energized, in both cases because the contacts are held by a latching magnet in the relay R1',R2'. When the voltage sensing and control logic circuit P' determines that a re-transfer operation is required (induced either automatically or manually as determined by the user), the relay coil C2' is again energized to open the contacts of the relay R2' and, after the required brief delay, the relay coil C1' is energized to close the contacts of the relay R1' to complete the re-transfer operation, after which the coils C1', C2' are again de-energized while the relay contacts of relay R1' are held closed and the relay contacts of the relay R2' are held open by the respective latching magnets of the relays R1',R2' (FIG. 2A).

The transfer switch ATS' according to the present development comprises means P' for sensing the voltage of the first and second sources S1,S2 and selectively and temporarily energizing the first and second magnetically latched relays R1',R2' to change the states thereof to switch the load L from the first source S1 to the second source S2 or vice versa. As shown, sensing and control logic circuits P' determine if the voltage of the source the unit is connected to (the preferred or primary source S1) is within the desired range set by the user (or, typically, pre-set at the factory). This range of acceptable voltages to the user's critical load L is typically + or −10% to 12% of nominal. Once it is determined by the sensing and control logic circuits P' that the source voltage S1 has fallen outside the required range and once the sensing and control logic circuits P' also determine that the voltage of the alternate or back-up source S2 is within the acceptable range, then the control logic P' of the transfer switch ATS' commands the relay R1' to open (by selectively and temporarily energizing coil C1') to disconnect the load L from the primary source S1 and, after a certain amount of time delay, the control logic P' also commands the relay R2' to close (by selectively and temporarily energizing coil C2') to connect the critical load L to the alternate or back up source S2, thus avoiding a disruption of the load, as shown in FIG. 2B and referred to herein as a "transferred" state. The total time for sensing of unacceptable voltage and the complete transfer operation (opening of the first relay R1' and closing of the second relay R2') is less than 20 milliseconds as established by the power quality industry as the acceptable length of an outage to critical electronic loads if they are to continue operation undisturbed. The purpose of the time delay before closing the contacts of the relay R2' is to be sure that the contacts of the relay R1' have opened completely so there is no chance of a cross connection between the preferred and alternate sources S1,S2. As such, the sensing and control logic circuits P' comprise voltage sensor circuitry for measuring the voltage levels at the voltage inputs I1,I2 and relay driving outputs for selectively energizing the relay coils C1',C2' all preferably controlled by a microprocessor or other solid state electronic controller device.

A preferred source selection process, where the user selects the desired source S1,S2 as the preferred source, causes the coils C1',C2' to be selectively and temporarily energized with respective switching currents as needed to open/close the contacts of the relays R1',R2' to achieve the selected default state for the transfer switch ATS', after which the contacts of the relays R1',R2' are magnetically latched and the coils C1', C2' are de-energized. The coils C1',C2' of the magnetically latched relays R1',R2' are therefore energized with a switching current only for the short duration during the actual transfer process, auto-retransfer process (automatic or manual) or the preferred source selection process as required to move the contacts of the relays R1',R2'. Once the contacts of the relays R1',R2' are moved, the coils are completely de-energized so that no switching current or holding current is provided, due to the fact that the contacts are magnetically latched. This leads to an automatic transfer switch of higher reliability as compared to prior-art devices.

In an automatic transfer switch ATS' formed in accordance with the present invention, contact bounce on transfer or re-transfer is substantially eliminated because movement of the contacts from opened to closed and/or closed to opened in both relays R1',R2' always requires the coils C1',C2' to be temporarily energized with a switching current to induce movement of the contacts, so that contact bounce is very unlikely or nearly impossible to occur, as opposed to conventional relays used in prior art devices where the contacts are allowed to move to their respective normally-closed or normally-opened conditions under force of a spring when the coils are de-energized resulting in multiple contact bounces during re-transfer, i.e., the present invention makes available an alternative electro-mechanical solution that also for all practical purposes eliminates the re-transfer contact bounce of the standard relays at much reduced cost vs. a solid state (e.g., SCR) solution. One contact bounce, which does not affect critical loads L, may be seen among numerous transfer/re-transfer operations using magnetically latched relays according to the present invention, but the multiple contact bounce on re-transfer associated with prior-art devices is eliminated by the present invention.

The invention has been described with reference to preferred embodiments. Of course, modifications and alterations will occur to others upon a reading and understanding of the preceding specification. It is intended that the invention as defined in the claims be construed as including all such modifications and alterations.

The invention claimed is:

1. An automatic transfer switch comprising:
a first voltage input adapted for connection to a first associated voltage source;
a second voltage input adapted for connection to a second associated voltage source;
a first magnetically latched relay having an opened state and a closed state, wherein said first magnetically latched relay is magnetically latched in either its opened or closed state by a first permanent magnet without a holding current supplied to said first magnetically latched relay;
a second magnetically latched relay having an opened state and a closed state, wherein said second magnetically latched relay is magnetically latched either its opened or closed state by a second permanent magnet without a holding current supplied to said second magnetically latched relay, wherein said second magnetically latched relay is in its opened state when said first magnetically latched relay is in its closed state, and wherein said second magnetically latched relay is in its closed state when said first magnetically latched relay is in its opened state;
first and second voltage outputs adapted for connection to an associated load, said first voltage output selectively connected to said first voltage input via said first magnetically latched relay when said first magnetically latched relay is in its closed state, and said second voltage output selectively connected to said second voltage input via said second magnetically latched relay when said second magnetically latched relay is in its closed state; and,
a voltage sensing and control logic circuit that monitors said first and second voltage inputs and that selectively and temporarily energizes said first and second magnetically latched relays, wherein one of said first and second magnetically latched relays changes from its opened state to its closed state and the other of said first and second magnetically latched relays changes from its closed state to its opened state when said first and second magnetically latched relays are selectively and temporarily energized by said voltage sensing and control logic circuit.

2. The automatic transfer switch of claim 1, wherein said first and second magnetically latched relays comprise respective coils that must be energized to change the state of said relays from closed to opened and also must be energized to change the state of said relays from opened to closed.

3. The automatic transfer switch of claim 1, wherein:
said first permanent magnet is provided by a first moving contact of said first relay; and,
said second permanent magnet is provided by a second moving contact of said second relay.

4. A method for selectively connecting a load to either a first voltage source or a second voltage source, said method comprising:
connecting a load to a first voltage source through a first magnetically latched relay comprising first contacts that are held in a closed state without a holding current;
temporarily energizing said first magnetically latched relay to open said first contacts to disconnect said first voltage source from said load, wherein said first magnetically latched relay is deenergized after said first contacts are opened and said first contacts are held open by a first permanent magnet without a holding current being supplied to said first relay;
after said first voltage source is disconnected from said load, temporarily energizing a second magnetically latched relay comprising second contacts to close said second contacts to connect said load to a second voltage source through said second magnetically latched relay, wherein said second magnetically latched relay is deenergized after said second contacts are closed and said second contacts are held closed by a second permanent magnet without a holding current being supplied to said second relay.

5. A method of reducing contact bounce in an automatic transfer switch, said method comprising:
connecting a load to a first voltage source using a first relay;
detecting a fault in said first voltage source;
after detecting a fault in said first voltage source, energizing said first relay to electromagnetically open contacts of said first relay to disconnect said load from said first voltage source;
after energizing said first relay to electromagnetically open contacts of said first relay to disconnect said load from said first voltage source, energizing said second relay to electromagnetically close contacts of said second relay to connect said load to said second voltage source.

6. The method of claim 5, further comprising:
after energizing the first relay to electromagnetically open contacts of the first relay to disconnect the load from the first voltage source, deenergizing the first relay and using a magnet to latch open the contacts of the first relay without a holding current; and, after energizing the second relay to electromagnetically close the contacts of the second relay to connect the load to the second voltage source, deenergizing the second relay and using a magnet to latch closed the contacts of the second relay without a holding current.

* * * * *